Jan. 28, 1947.  W. SHARP  2,415,048
EQUIPMENT FOR TREATING SEWAGE
Filed April 19, 1943   3 Sheets-Sheet 1

INVENTOR.
WILLIAM SHARP.
BY
Geo. B. Pitts

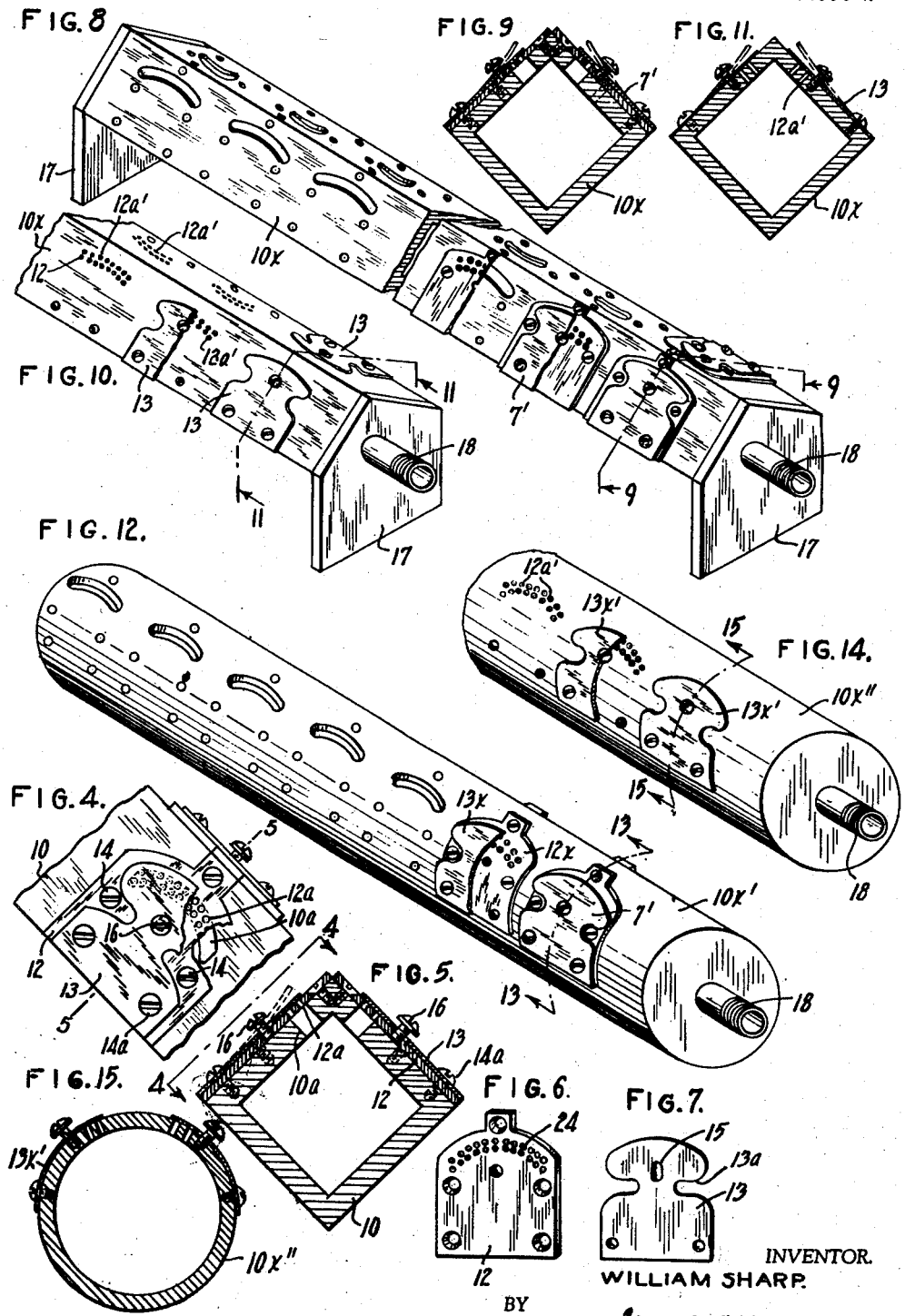

Jan. 28, 1947. W. SHARP 2,415,048
EQUIPMENT FOR TREATING SEWAGE
Filed April 19, 1943 3 Sheets-Sheet 3
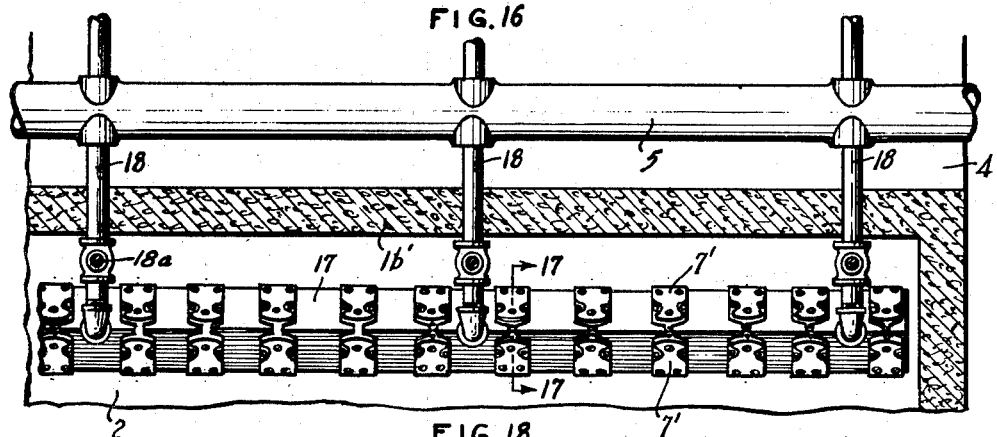
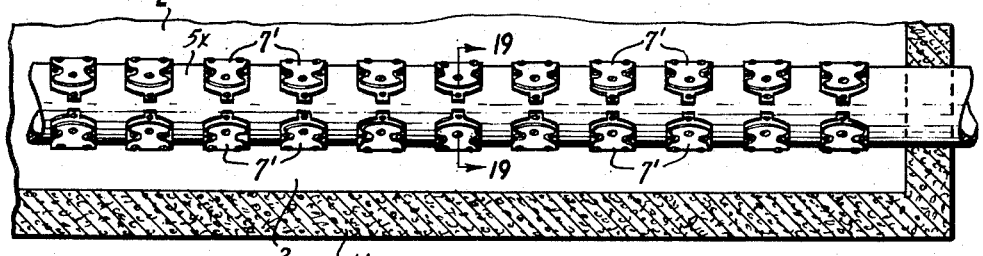
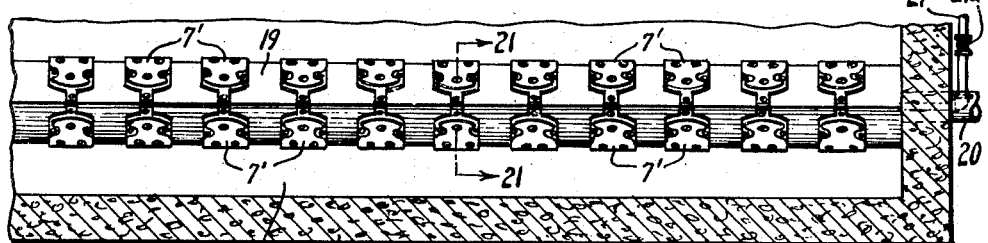
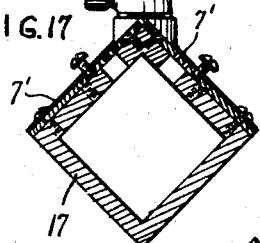
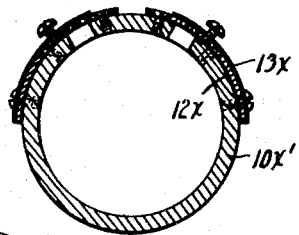
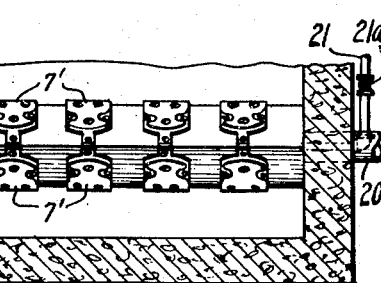
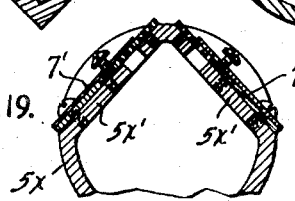
INVENTOR.
WILLIAM SHARP.
BY Geo. B. Pitts Patented Jan. 28, 1947

2,415,048

UNITED STATES PATENT OFFICE 2,415,048

EQUIPMENT FOR TREATING SEWAGE

William Sharp, Cleveland, Ohio

Application April 19, 1943, Serial No. 483,574

14 Claims. (Cl. 261—124)

This invention relates to sewage treatment, more particularly to a sewage process of the activated sludge type, wherein aeration is employed to effect clarification or purification of the sewage.

In the equipment required for activating sludge, the operation of the means for diffusing air through the sewage determines to a large extent the efficiency of purification thereof, whereby the sewage is properly conditioned for further treatment. To meet this requirement, experience has demonstrated that approximately one cubic foot of diffused air per minute is needed per gallon of sewage, and when the air supply is inadequate or impaired the sewage becomes septic.

The motion or agitation of the sewage is, in most types of equipment, dependent upon an adequately maintained air supply to secure a uniform motion of the sewage, with long contact of the air therewith, the quantity of supplied air being dependent upon the volume of sewage to insure economical operation of the process.

Heretofore, so far as I have knowledge, the diffusion means employed consisted of porous plates or pipes having porous walls. These plates and pipes were formed of fused crystalline alumina bonded by a suitable ceramic or other material, or a high-silica sand bonded by synthetic silicate, to provide a predetermined permeability.

The porosity of these devices was due to the minute spaces or interstices between the grains of the material, which space obviously extended in all directions therebetween, so that the grains formed between them, a labyrinth of pores or channels, some closed and forming pockets and others restricted, whereby clogging of these pores resulted in a relatively short time, and thus impaired the required supply of air to insure sufficient aeration. This clogging in turn would effect a back pressure on the motors, which operate the blowers, causing heating thereof as well as waste of power or current. Because of the formation and arrangement of the spaces or interstices in these devices, attempts to clean them were not satisfactory, as upon replacement thereof in use, clogging resulted in a relatively short period of time. Furthermore, in practice in the use of these devices, allowance had to be made for their capability to clog and also the effect of water and precipitate of the sewage thereon.

One object of the invention is to provide in a tank for aerating sewage, improved air diffusion means wherein these various objections are overcome, so that efficient operation may take place over a long period of time and the supply of air at a predetermined pressure may be economically maintained.

Another object of the invention is to provide improved diffusion means for aerating sewage in a tank wherein the diffusion means are constructed to prevent oxidation of or other reaction on the parts thereof due to water and various ingredients in the sewage.

Another object of the invention is to provide in equipment of this type an improved air diffusion mechanism wherein the air is discharged in finely divided streams or jets and then diffused over a wide area.

Another object of the invention is to provide in apparatus for treating sewage improved air diffusion means which will not clog up due to oxidation or contamination resulting from the sewage or ingredients therein, to insure unimpaired delivery of the air.

Another object of the invention is to provide in equipment of this type an improved air injection and diffusing mechanism arranged to automatically close due to cut-off or drop in the pressure of the air supply, to prevent inflow of the sewage or water content thereof.

A further object of the invention is to provide in equipment of this type an improved air injection and diffusion mechanism which is normally closed and opens to a predetermined position, due to the pressure of the supplied air, to provide diffusion thereof, but automatically closes when the air pressure drops or is cut off, so that the static head of the sewage seals the mechanism and prevents seepage of the sewage through the mechanism and into the air supply conduits.

A further object of the invention is to provide improved air diffusion means wherein the diffusion may be regulated or controlled.

A further object of the invention is to provide an improved process of diffusing air for injection in sewage.

A still further object of this invention is to provide improved air diffusion means, the parts of which may be readily assembled and disassembled.

Other objects of the invention will be apparent to those skilled in the art to which my invention relates from the following description taken in connection with the accompanying drawings.

The disclosure herein is shown applied to a process wherein the motion imparted to the sewage is spiral, generally referred to as the spiral-flow system of air diffusion, but the diffusion means may be applied to tanks for preliminarily aerating sewage or in processes involving a different flow of the sewage, the particular disclosure herein being merely for descriptive purposes and not for the purpose of limiting the scope of the invention.

Fig. 4 is a fragmentary, enlarged perspective view of an air conduit and the air diffusing means thereon; also a view on the line 4—4 of Fig. 5.

Fig. 5 is a section on the line 5—5 of Fig. 2, enlarged; also a section on the line 5—5 of Fig. 4.

Figs. 6 and 7 are perspective views of details.

Fig. 8 is a perspective view showing a modified form of construction.

Fig. 9 is a section on the line 9—9 of Fig. 8.

Fig. 10 is a fragmentary perspective view showing another modified form of construction.

Fig. 11 is a section on the line 11—11 of Fig. 10.

Fig. 12 is a perspective view showing another modified form of construction.

Fig. 13 is a section on the line 13—13 of Fig. 12.

Fig. 14 is a fragmentary perspective view showing a different modification.

Fig. 15 is a section on the line 15—15 of Fig. 14.

Fig. 16 is a fragmentary plan view showing a different arrangement of the air conduits (one conduit only being shown).

Fig. 17 is a section on the line 17—17 of Fig. 16.

Fig. 18 is a fragmentary plan view showing a modified form of construction.

Fig. 19 is a fragmentary section on the line 19—19 of Fig. 18.

Fig. 20 is a fragmentary plan view showing another modified form of construction.

Fig. 21 is a section on the line 21—21 of Fig. 20.

Figure 1:
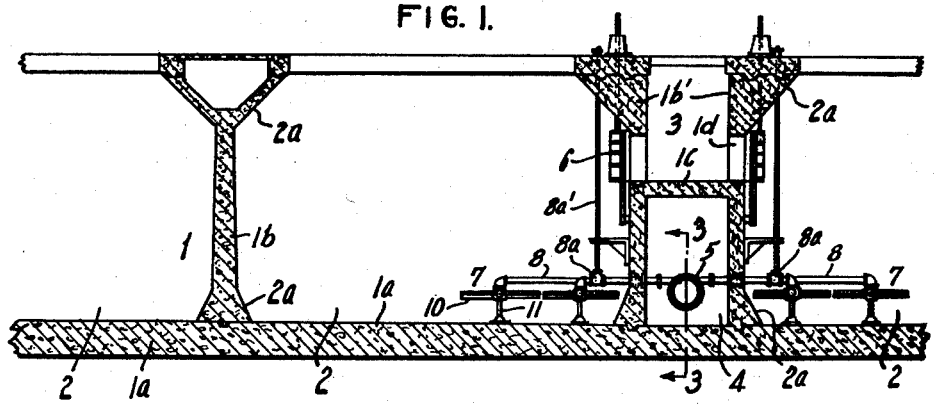
Fig. 1 is a sectional view showing a portion of a sewage treatment apparatus embodying my invention.

In the drawings, referring particularly to Figs. 1, 2, 3, 4, 5, 6 and 7, 1 indicates as an entirety, a portion of an apparatus for treating sewage, that is, that portion in the treating process wherein purification of the sewage is effected by the supply thereto of air in a diffused state and the air is utilized to impart motion to or circulation of the sewage so that the latter is kept highly active to the end that purification may be relatively rapid. The apparatus 1 shown as exemplifying one application of the invention, consists of a bed 1a mounting spaced vertical walls 1b, 1b', to provide a series of tanks 2 in side by side relation, the walls 1b' and a transverse wall 1c between them being arranged to form a supply channel 3 for sewage for two adjacent tanks, and a tunnel 4 below the wall 1c through which extends an air conduit 5. The conduit 5 is connected to a power driven blower (not shown).

The tanks 2 preferably have a predetermined width to control the flow of the sewage, but may be of any desired length. The walls 1b' are provided with openings 1d controlled by movable gates 6 through which the sewage is discharged to the tanks 2. 7 indicates as an entirety the air diffusion means arranged adjacent the bottom 1a and one side wall of the tank, preferably that wall (1b') through which the sewage is discharged.

The air diffusion means 7 extend throughout the length of each tank 2. The inner sides of the walls 1b, 1b', at their upper and lower ends, are provided with fillets 2a to give direction to the flow of the sewage during diffusion of air thereinto. In this form of wall construction and arrangement of the air diffusion means 7, an upward motion at one side of the tank is imparted to the sewage. The fillet 2a at the top of the wall 1b' directs or bends the flow horizontally, whereas the fillets 2a on the wall 1b directs the flow downwardly and then toward the wall 1b', so that the body of the sewage takes on a spiral flow, the diffused air in the form of fine bubbles commingling with and rising through the flow stream. As the supply of sewage is continuous provision is made for conveying from the tank the activated sludge, a part of which may be returned to the tank 2 for mixture with the sewage being treated therein.

The openings through which the activated sludge leaves the tank and the conduit and inlet for returning a portion thereof to the tank are not shown, as being well known and not necessary to a full understanding of my invention.

The air diffusion means 7 consist of one or more pipes connected with the air conduit 5.

Figure 2:
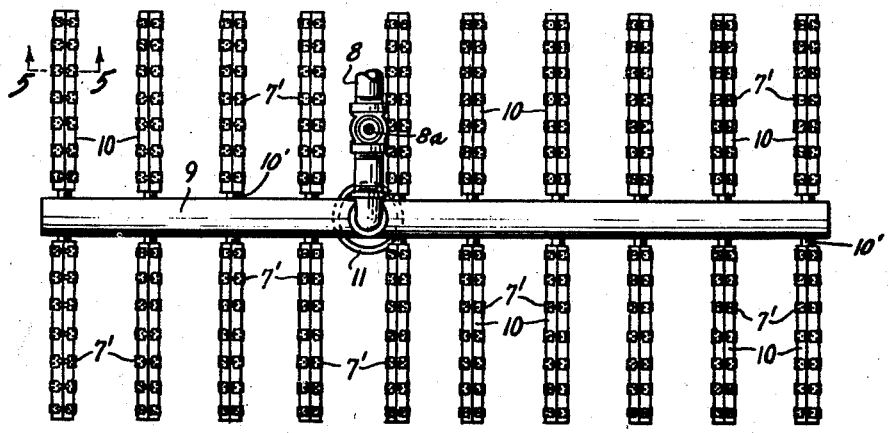
Fig. 2 is a plan view of parts shown in Fig. 1, enlarged.
Figure 3:
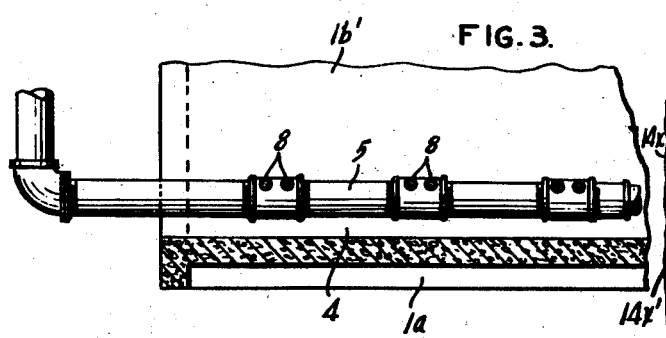
Fig. 3 is a fragmentary section on the line 3—3 of Fig. 1.

In the form of construction shown in Figs. 1 and 2, the conduit 5 is connected by pipes 8 to manifolds 9, each of which in turn is connected at opposite sides thereof to a set or plurality of spaced, parallelly related pipes 10, closed at their outer ends and each carrying a plurality of air diffusion devices 7' later referred to. The inner ends of the pipes 10 are provided with screw threaded nipples 10', which are threaded into the wall of the adjacent manifold 9. In this form of construction sets of pipes 10 may be arranged in a row in end to end relation throughout the length of the adjacent tank 2, or in two rows as shown in Fig. 1. Each set of pipes 10 may be removably supported on a suitable standard 11. Each pipe 8 may be provided with a valve 8a, having a shank 8a' leading to a point above the wall 1b', to regulate the air supply.

The diffusion devices 7' are arranged to first break up the flow of air from each pipe 10 into relatively fine streams and then to supplement this action by breaking up the streams into relatively small particles which are spread outwardly and radially over a wide area to obtain the maximum diffusion. These air particles which are injected into the sewage, and commingle therewith to aerate and induce its upward movement at one side of the tank maintain the entire volume of sewage in motion as already set forth. The diffusion devices 7' consist of pairs of related elements, each pair being similar in construction so that only the diffusion devices forming one pair of elements will be described. As shown in Figs. 1, 2, 4, and 5, the pipes 10 are polygonally shaped in cross section, (preferably square), and arranged so that two adjacent sides are disposed at substantially an angle of 45 degrees above and below an imaginary horizontal plane, the diffusion devices in this form of construction being mounted on the sides above this plane. As shown in Figs. 4, 5, 6, and 7, the related diffusion elements consist of an inner plate 12 suitably secured in face to face relation to the outer side wall of the adjacent pipe 10, and an outer plate 13. By preference the outer plate 13 is relatively thin and formed of resilient material (preferably metal), and normally disposed in face to face relation to the inner plate 12 for a purpose later set forth. Both plates 12 and 13 are preferably formed of non-oxidizing metal (such as stainless steel) which will not be attacked by the water and/or various ingredients in the sewage. The plate 12 is preferably secured to the adjacent wall of the pipe by a plurality of screws 14, 14a, the latter being utilized to secure the lower end portion of the outer plate 13 in position, whereby its upper end portion is free to swing or flex outwardly (see dotted lines in Fig. 5). The upper portion of the plate 12 is formed with a plurality of relative small openings 12a in registry with a slot 10a formed in the adjacent pipe 10; whereby the air supplied to the latter, and flowing through the openings 12a is broken up into relatively fine streams as it passes through the plate 12. Each of the openings 12a preferably has a diameter of approximately .062 of an inch. In the form of construction shown I provide 24 openings 12a, but the number may be increased or reduced. The upper portion of the plate 13 is shaped to extend over that area of the plate 12 in which the openings 12a are formed and normally closes these openings, but due to the fact that the plate 13 is formed of resilient metal, the pressure of the air flowing through the openings 12a serves to flex the plate 13 outwardly, as shown in dotted lines (Fig. 5), so that the air streams impinging against the plate 13 are broken up into fine particles and diffused outwardly and substantially radially over a large area of the surrounding moving sewage. As shown, the lateral portions of the plate 13 intermediate its upper and lower portions are cut away as shown at 13a, so that its upper portion is connected to its lower portion by a relatively narrow central neck, whereby flexing of the upper portion of the plate under the influence of the air is facilitated.

By preference, the slot 10a formed in the pipe 10 is arc-shaped, the openings 12a are formed in rows correspondingly shaped and the upper terminating marginal edge of the plate 13 is concentric to the rows of the openings 12a, so that the plate 13 serves to direct the particles of air upwardly and outwardly in a fan-like direction. As the related diffusion elements 12—13 are arranged in side by side relation along the upper walls of each pipe 10, the air diffusion into the flowing sewage is substantially uniform from end to end of the tank 2.

From the foregoing description it will be noted that each of the related diffusion devices 7' consists of one element for breaking up the air flow into fine streams and a deflecting device which transforms these streams into small or minute particles for diffusion into the sewage.

Due to the fact that the plate 13 is resilient and normally closes the openings 12a, it will be observed that if the air pressure falls off or drops to zero, these openings will be automatically closed and the static head pressure of the sewage on the plate 13 will insure a sealing of the openings 12a thereby, so that danger of seepage of water and/or activated sludge or sewage into the adjacent pipe 10 and other parts of the system will be eliminated.

It will also be observed that by forming the plates 12 and 13 of a metal which will not be attacked by the water and/or ingredients in the sewage or sludge, danger of the openings 12a becoming clogged is eliminated, thereby making cleaning unnecessary and insuring long life to the diffusion means 7.

Also, since the openings 12a lead directly through the pipe wall and clogging thereof is eliminated, (a) frictional resistance to air flow is reduced so that less power is required to maintain the required air pressure as compared to diffusion plates or pipes hereinbefore referred to and (b) these openings may be accurately calibrated volumetrically so that by employing a blower having a predetermined capacity, the volume and pressure of the diffused air may be maintained constant and uniform.

In the form of construction shown, pairs of diffusion devices 7' are arranged side by side on each upper wall of the pipe 10, each pair on one wall being opposite to a pair on the adjacent upper wall, but these pairs of devices may be arranged differently, for example, those on one wall staggered with respect to those on the other wall. The length of the pipes 10 and the number of pairs of diffusion devices 7' as well as the volume of air and pressure thereof, will depend upon the capacity of the tank and the oxygen demand of the sewage supplied thereto to effect clarification and purification.

By preference means are provided for controlling the operation of the deflecting element 13, which control may be found desirable to prevent undue flexing of this element or due to the static head of the sewage in the tank 2 or for other reasons, to insure desired air diffusion with economical operation.

The control means preferably consist in forming in the deflecting element 13 a slot 15, and providing on the plate 12 a screw 16, the shank of which extends through the slot 15 and is threaded into the plate 12, the head of the screw having an overlapping relation to the walls of the slot 15, spaced from the element 13 to limit the outward flexing thereof. By turning the screw 16, the flexing of the plate a greater or lesser distance is controlled.

Figs. 8 and 9 show a modified form of construction wherein the air pipe 10x carrying the diffusion devices 7' is supported on legs 17 and provided with a threaded inlet pipe 18, which may be suitably connected to the air supply conduit.

Figs. 10 and 11 illustrate a modified form of construction wherein the walls of the pipe 10x are formed with a plurality of openings 12a' to break up the air into fine streams and the resilient deflecting element 13 is secured in face-to-face relation thereto so as to normally close the openings 12a', the plate 13 being operable in the manner heretofore set forth.

Figs. 12 and 13 show a construction similar to that shown in Figs. 8 and 9, except that the air pipe 10x', which carries the diffusion elements 12x, 13x, is round or cylindrical and the diffusion elements are curvilinear to conform to the shape of the pipe wall.

Figs. 14 and 15 show a construction similar to that shown in Figs. 10 and 11, except that the pipe 10x'' is round or cylindrical and the resilient deflecting element 13x' is curvilinear to conform to the pipe wall.

It will be understood that in the forms of construction shown in Figs. 10, 11, 14 and 15, (a) the pipes which carry the diffusion devices are preferably formed of a metal (such as stainless steel) which will not be attacked by the water and/or ingredients in the sludge or sewage, to avoid clogging of the openings in the walls thereof, and (b) the pipe wall having the openings 12a' effects the breaking up of the air into fine streams, so that a separate plate 12 is eliminated.

Figs. 16 and 17 illustrate a modified arrangement wherein one or more pipes 17 (only one being shown), which carry the diffusion devices 7', extend longitudinally of the tank 2, in parallel relation, adjacent to the side wall 1b' thereof. In this arrangement an air supply connection 18 between the air conduit 5 and each pipe 17 is provided at spaced points along the latter. Each connection 18 may be provided with a valve 18a, the shank of which extends to a point of access.

Figs. 18 and 19 illustrate a modified form of construction wherein the air conduit, indicated at 5x, leads through the end wall of the tank 2 and extends longitudinally thereof and pairs of related diffusion devices 7' are mounted on the walls of the conduit in side by side relation, preferably at opposite sides of an imaginary vertical plane cutting the axis of the conduit. Also, by preference, those portions of the wall of the conduit 5x to which the diffusion devices 7' are secured and related are flattened, as shown at 5x' (Fig. 19).

Figs. 20 and 21 show a modified arrangement wherein one or more pipes, indicated at 19, (only one being shown), which carry the diffusion devices 7', are partially embedded in the floor or bottom wall of the tank. Where the pipes 19 are square in cross section, the pipes are arranged so that two adjacent side walls are disposed at an angle of 45 degrees to an imaginary horizontal plane, the lower adjacent side walls being embedded in the floor or bottom wall 1a of the tank 2 and the two upper adjacent side walls being exposed above the floor or bottom wall and carrying the diffusion devices 7', the latter being mounted similarly to that shown in Figs. 4 and 5. In this form of construction, the pipes 19 may extend longitudinally of the tank, as shown in Fig. 20, or the pipes may be short in length and extend at right angles to the side wall of the tank. The air supply pipe 20 for the pipe 19 leads through one wall of the tank, for example, the end wall thereof. 21 indicates a bleeder drain pipe leading from the pipe 19 for water due to condensation.

The pipe 21 is provided with a normally closed valve 21a, arranged to automatically open due to the pressure of the air, so that as long as air is being supplied to the pipe 19, the valve 21a remains open to permit drainage of the water.

Figures 22, 23:
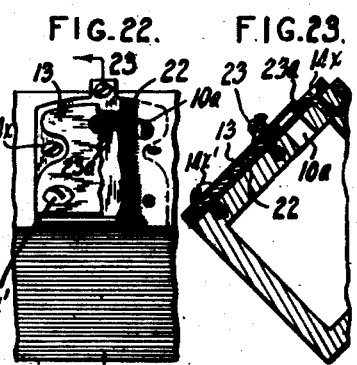
Fig. 22 is a fragmentary elevation showing a different form of construction.
Fig. 23 is a section on the line 23—23 of Fig. 22.

Figs. 22 and 23 illustrate a modified form of construction wherein the diffusion element which breaks up the air into fine streams consists of a section of wire screen material 22, preferably stainless steel, which may have any desired mesh. The material 22 lies over the slot 10a formed in the pipe 10 and is held in face-to-face relation with the wall thereof by a plate 23, suitably secured to the pipe wall, as by screws 14x, 14x', the plate 23 being formed with a slot 23a coextensive in area and shape to the slot 10a, and the resilient deflecting element 13 being secured at its lower portion to the plate 23 by the screws 14x'.

It will also be observed that where the diffusion devices are provided with control means, the latter may not only be adjusted to limit the flexing of one or more deflecting elements 13 but may be operated to prevent any flexing movement of one or more deflecting elements 13, so as to entirely close the openings or outlets from the adjacent pipe or pipes, whereby the total volume of air discharged into the sewage or sludge in a diffused state may be regulated dependent upon the demand of oxygen, which demand can be determined from time to time by testing the activated sludge.

By preference all of the deflecting elements are adjusted by the control means to a predetermined position prior to the operation of the equipment, and where the quantity of air is found to be excessive a main valve in the air conduit or the valves in the pipes 8 (or 18) are operated to regulate the air supply.

In the forms of construction shown in Figs. 10, 11, 12 and 13, the regulating or control screws 16 are mounted in the wall of the adjacent pipe.

Where a valved bleeder drain pipe is provided for each air pipe, the valve element and its seat are relatively small in size to prevent undue flow of air therethrough and thus insure economical operation of the equipment.

To those skilled in the art to which my invention relates many changes in construction and widely differing embodiments and applications of the invention will be apparent without departing from the spirit and scope thereof. My disclosures and the description herein are purely illustrative and not intended to be in any sense limiting.

What I claim is:

1. In equipment for aerating and circulating sewage, the combination with a tank and means for supplying sewage thereto, of a horizontally disposed air pipe mounted in the tank adjacent the bottom thereof and connected to a source of air supply under pressure, the air outlet from said pipe consisting of a plurality of relatively small openings formed in its upper portion and arranged to discharge the air therefrom in fine streams into said tank and a plate the lower portion of which is fixed to said pipe and its upper portion extends upwardly and outwardly therefrom and disposed in the path of the air streams discharged through said openings, the surface of said latter portion, due to the impingement of the air thereon under pressure, serving to divert the air upwardly at an angle to the direction of flow thereof and to break up the air into small particles for diffusion into the sewage, to purify and effect upward flow thereof.

2. Equipment as claimed in claim 1 wherein that portion of the plate against which the air streams impinge is movable toward and from said pipe and disposed normally in engagement therewith to close the air discharge openings in said pipe, the pressure of the air discharged from said openings serving to move said movable portion outwardly into operative position, and means for limiting the outward movement of said movable portion.

3. Equipment as claimed in claim 1 wherein said plate is formed of resilient material, that portion of the plate against which the air streams impinge being normally disposed in engagement with the walls of the pipe to close said discharge openings therein but adapted to be flexed outwardly into operative position due to discharge of air through said discharge openings.

4. In equipment for aerating and circulating sewage, the combination with a tank and means for supplying sewage thereto, of means for diffusing air into the sewage in said tank, said means comprising a pipe in the lower portion of said tank and having a plurality of relatively small outlets to permit discharge of the air in small streams into said tank and a wall formed of resilient material and consisting of a portion fixedly related to said pipe and a movable portion normally closing said outlets, arranged to be flexed outwardly due to the pressure of the air discharged from said outlets, said movable wall portion when in outwardly flexed position being in the path of the air streams and arranged to break up the streams of air into fine particles, forming bubbles for diffusion in the sewage and effecting upward flow thereof, and means for supplying air under pressure to said pipe.

5. Equipment as claimed in claim 1 wherein the wall of the pipe is formed of a material incapable of attack by the water and ingredients in the sewage.

6. Equipment as claimed in claim 4 wherein means are provided for adjustably limiting the flexing of the movable portion of said resilient wall.

7. In equipment for aerating and circulating sewage, the combination with a tank and means for supplying sewage thereto, of means for diffusing air into the sewage and effecting circulation thereof, comprising a pipe formed with an opening, a wall fixed to said pipe and formed with a plurality of relatively small air outlets in registry with said opening and arranged to discharge air in fine streams from said pipe, a plate formed of resilient material and having a portion fixedly related to said pipe and a portion normally engaging the outer face of said wall to close said outlets and arranged to be flexed outwardly due to pressure of the air thereon to open said outlets, said portion when flexed outwardly being disposed in the path of movement of the air streams and operable to divert the air upwardly at an angle to the flow thereof and thereby break up the air streams into small particles for diffusing into the sewage and effect upward movement thereof; and means for supplying air under pressure to said pipe.

8. In equipment for purifying and clarifying sewage, the combination with a tank and means for supplying sewage thereto, of a horizontally disposed pipe in the lower portion of said tank and diffusion means along the upper portion of said pipe at one side of a vertical plane cutting the axis thereof, said means consisting of longitudinally spaced series of relatively small air outlets leading from said pipe for discharging the air in small streams therefrom into said tank and walls, one for each series of outlets, mounted on the outer side of said pipe and each having a lower portion fixed to said pipe and an upper movable portion normally disposed in engagement with said pipe to close the adjacent series of outlets and movable outwardly, due to the pressure of the air discharged from said outlets, into the path of the air streams discharged therefrom and arranged to divert the air streams upwardly at an angle to the direction of the flow thereof and break the air up into small particles for diffusion into the sewage, means for adjustably limiting the outward movement of each of said movable wall portions, and means for supplying air under pressure to said pipe.

9. Equipment as claimed in claim 8 wherein each of said walls is formed of resilient material, one end portion of each wall being fixedly related to said pipe and its other end portion normally sealing the adjacent outlets but free to flex outwardly into the path of movement of the air streams due to the pressure of the air discharged from said outlets.

10. Equipment as claimed in claim 8 wherein each of said walls is formed of resilient material, one end portion of each wall being fixedly related to said pipe and its other end portion normally sealing the adjacent outlets but free to flex outwardly into the path of the air streams due to pressure of the air discharged from said outlets, and means are provided for adjustably limiting the flexing of each said wall portion.

11. In equipment for clarifying and purifying sewage, the combination with a tank and means for supplying sewage thereto, of a pipe formed with an opening, a section of screen material in registry with and covering said opening, means for securing said section of screen material in position, and a wall formed of resilient material having a portion fixedly related to said pipe and another portion normally engaging the screen material to close the openings therein but arranged to flex outwardly due to pressure of air flowing through the said opening, said other portion of said wall, when in outwardly flexed position, being arranged to divert the air upwardly at an angle to its direction of flow to break it up into small particles for diffusion in the sewage, and means for supplying air under pressure to said pipe.

12. In equipment for purifying and clarifying sewage, the combination with a tank and means for supplying sewage thereto, of a pipe partially embedded in the floor or bottom wall of said tank, and diffusion means on the exposed portion of said pipe comprising a plurality of relatively small outlets leading from said pipe to discharge the air therefrom in streams into said tank, and a wall formed of resilient material fixedly related to said pipe and having a portion lying over said outlets to normally close them, said portion being free to flex outwardly due to the pressure of the air discharged from said outlets, said wall portion, when in outward position, being disposed in the path of the air streams and serving to break them up into small particles for diffusion in the sewage, and means for supplying air under pressure to said pipe.

13. In equipment for aerating and circulating sewage, the combination with a tank and means for supplying sewage thereto, of an air pipe mounted in said tank adjacent to the floor thereof and having a plurality of relatively small air outlets arranged to discharge the air from said pipe in small streams into said tank, a plate formed of resilient material having one end portion thereof fixedly related to said pipe and another end portion thereof normally closing said outlets but freely operable outwardly due to the pressure of the air discharged from said outlets, said last mentioned portion, when in outwardly flexed position, being disposed in the path of the air streams and serving to break up the air streams into fine particles for diffusion into the sewage, said plate being reduced intermediate its fixed and free end portions, and means for supplying air under pressure to said pipe.

14. Means for diffusing air into sewage in a tank comprising an air supply pipe formed with an opening, a wall fixedly related to said pipe and formed with a plurality of relatively small openings in registry with said first mentioned opening for discharging air passing through the opening in the pipe in small streams and a plate formed of resilient material, the lower end portion of the plate being fixedly related to said wall and its upper end portion being free and arranged to normally engage that portion of said wall in which the discharge openings are formed to close the latter, but adapted to flex outwardly due to the pressure of the air supplied to the pipe, said upper free end portion of said plate, when flexed outwardly, being arranged to divert the air discharged from said small openings upwardly at an angle to the direction of flow thereof and break up the air streams into small particles for diffusion in the sewage.

WILLIAM SHARP.